United States Patent
Liu

(10) Patent No.: US 9,676,675 B2
(45) Date of Patent: Jun. 13, 2017

(54) MULTI-EFFECT TREE DRIPPING LIQUID AND USAGE THEREOF

(75) Inventor: Mian Liu, Guangdong (CN)

(73) Assignee: Lingnan Landscape Co., Ltd., Dongguan (CN)

( * ) Notice: Subject to any disclaimer, the term of this patent is extended or adjusted under 35 U.S.C. 154(b) by 158 days.

(21) Appl. No.: 14/351,636

(22) PCT Filed: Jun. 15, 2012

(86) PCT No.: PCT/CN2012/076962
§ 371 (c)(1),
(2), (4) Date: Apr. 14, 2014

(87) PCT Pub. No.: WO2013/060147
PCT Pub. Date: May 2, 2013

(65) Prior Publication Data
US 2014/0245662 A1    Sep. 4, 2014

(30) Foreign Application Priority Data
Oct. 26, 2011 (CN) .......................... 2011 1 0330281

(51) Int. Cl.
*A01G 29/00* (2006.01)
*C05G 3/02* (2006.01)
*C05D 9/02* (2006.01)
*A01G 7/06* (2006.01)

(52) U.S. Cl.
CPC ............. *C05G 3/02* (2013.01); *A01G 7/06* (2013.01); *C05D 9/02* (2013.01)

(58) Field of Classification Search
CPC ........................................... A01G 7/06
USPC ........................................... 47/57.5
See application file for complete search history.

(56) References Cited

U.S. PATENT DOCUMENTS

| 3,268,394 A * | 8/1966 | Dorfman ................. A01N 37/44 |
| | | 514/461 |
| 6,110,890 A * | 8/2000 | Hubbes ................... A01N 63/04 |
| | | 514/3.3 |

FOREIGN PATENT DOCUMENTS

| CN | 1272300 | 11/2000 |
| CN | 1765840 | 5/2006 |
| CN | 101080995 | 12/2007 |
| CN | 101306963 | 11/2008 |
| CN | 101348393 | 1/2009 |
| CN | 101695283 | 4/2010 |
| CN | 101805218 | 8/2010 |
| CN | 101811909 | 8/2010 |
| CN | 102924173 | 2/2013 |
| CN | 103274871 | 9/2013 |

OTHER PUBLICATIONS

International Search Report for International Patent Application No. PCT/CN2012/076962, mailed Sep. 20, 2012.

* cited by examiner

*Primary Examiner* — Kristen C Hayes
(74) *Attorney, Agent, or Firm* — McAndrews, Held & Malloy, Ltd.

(57) ABSTRACT

The present disclosure relates to multi-effect tree dripping liquid and usage thereof. The dripping liquid includes coconut, *astragalus* and *ephedra* root extract, glucose, coenzyme A, adenosine triphosphate, vitamin B1, vitamin C, dexamethasone sodium phosphate, seaweed essence, brassinolide, boric acid, manganese sulfate, zinc sulfate, a plant growth hormone, their volume percentages are 20% to 30% of coconut fumet, 5% to 13% of coconut meat extract, 28% to 38% of *astragalus* and *ephedra* root extract, 10% to 15% of 50% glucose injection, 2% to 7% of 99.8% seaweed essence, 5% to 11% of 0.0016% brassinolide, 2% to 7% of potassium sorbate, boric acid, manganese sulfate, zinc sulfate, plant growth hormone, a trace amount of preservative, distilled water. The multi-effect tree dripping liquid can achieve the purposes of supplying nutrients, balancing the water content inside the bodies of seedlings, preventing water transpiration, fast healing trauma root wounds, promoting early rooting, and preventing infection.

1 Claim, No Drawings

MULTI-EFFECT TREE DRIPPING LIQUID AND USAGE THEREOF

TECHNICAL FIELD

The present disclosure relates to the technical field of landscape planting, is suitable for fast recovering in big tree transplantation in landscape engineering, and especially refers to a multi-effect tree dripping liquid and usage thereof.

BACKGROUND

The roots of big trees will undergo severe trauma after transplantation, thus the wounded roots will fail to absorb water and organic matters from soil over a period of time while metabolism goes on continuously in the bodies of seedlings after root pruning. Therefore, energy synthesized in the bodies is far less than that decomposed, which is easy to cause energy deficiency and water imbalance, or even leads to the deaths of trees in severe cases. So, four major measures, including nutrition supplementation, water balancing, transpiration prevention, and rooting promotion need to be taken after big tree transplantation to ensure the rate of survival in big tree transplantation. At present, although measures including nutrition supplementation, water balancing, prevention of water transpiration and rooting promotion etc. are taken after big tree transplantation on the market, the several links are implemented independently with complicated operational processes. In addition, most dripping liquids supplied on the market are synthetic components which cannot be directly utilized by plants and have to go through complicated conversion processes in which a series of enzymes participate in tree bodies to be absorbed by plants.

At present, there are two antitranspirants on the market, one of which is a membrane antitranspirant, i.e. a closing membrane is formed after the antitranspirant is sprayed on the surface of a plant to prevent plant transpiration. It is because of the full closing effect of the antitranspirant that seedlings are deficient in reasonable transpiration, thus heat cannot be metabolized normally and is accumulated in a large amount to greatly increase the temperature in the bodies of the seedlings. The seedlings will be scorched if the antitranspirant is used in a high temperature season. The other antitranspirant is a regulatory antitranspirant which is mainly prepared from fulvic acid etc. sprayed on the surfaces of seedlings to regulate plant stomatal apertures to prevent transpiration. Although fulvic acid etc. has certain regulatory effect on stomata, transpiration is effectively prevented for a relatively short period of time, and water transpiration of the seedlings cannot be prevented in long term, specially in rainy days or dewy days when the sprayed antitranspirant will be washed to lose the anti-transpiration effect immediately.

SUMMARY

The objective of the present disclosure is to provide a multi-effect tree dripping liquid and usage thereof to solve disadvantages of the prior art. The dripping liquid can achieve multiple purposes of supplying nutrients, balancing the water content inside the bodies of seedlings, preventing water transpiration, fast healing trauma root wounds, promoting early rooting, and preventing infection etc. by one-shot application.

The present disclosure further solves the problem that a synthetic dripping liquid cannot be directly absorbed by a plant, i.e. coconut fumet is used as a sap supplement. Being a sap stored by a plant body, the coconut fumet can effectively supply nutrients and maintain water balance for transplanted seedlings without complicated conversion processes in plant bodies.

In addition, to solve the disadvantages of the membrane antitranspirant and the regulatory antitranspirant, the present disclosure uses *astragalus* and *ephedra* root to regulate plant cell stomata to prevent transpiration.

A technical solution applied by the multi-effect tree dripping liquid is as follows: raw materials of the multi-effect tree dripping liquid include: coconut fumet, coconut meat, *astragalus* and *ephedra* root extract, glucose, coenzyme A, adenosine triphosphate, vitamin B1, vitamin C, dexamethasone sodium phosphate, seaweed essence, brassinolide, boric acid, manganese sulfate, zinc sulfate, a plant growth hormone, and a preservative; the volume percentages of the raw materials are as follows: 20% to 30% of coconut fumet, 5% to 13% of coconut meat extract, 28% to 38% of *astragalus* and *ephedra* root extract, 10% to 15% of 50% glucose injection, 2% to 7% of 99.8% seaweed essence, 5% to 11% of 0.0016% brassinolide, 2% to 7% of potassium sorbate; 600 to 1200 international units of coenzyme A, 40 to 60 mg of adenosine triphosphate, 300 to 500 mg of vitamin B1, 1 to 2 g of vitamin C, and 10 to 15 mg of dexamethasone sodium phosphate are added to each liter of the multi-effect tree dripping liquid, and a trace amount of boric acid, manganese sulfate, zinc sulfate, the plant growth hormone, and the preservative are added, and distilled water made up to 100%.

A method for preparing the multi-effect tree dripping liquid includes the following steps:

Step 1: use methods including decocting and distilling, or pressing, grinding, and soaking and filtering and the like to prepare *astragalus* and *ephedra* root into an *astragalus* and *ephedra* root extract and seal the *astragalus* and *ephedra* root extract for further use;

Step 2: take out coconut fumet and guide the coconut fumet into a container to be sealed and stored for further use;

Step 3: press, grind, soak and filter coconut meat, and obtain coconut meat extract, which is sealed for further use;

Step 4: according to the volume percentage of each raw material, add a glucose injection, coenzyme A, adenosine triphosphate dissolved with a 50% glucose injection, vitamin B1, vitamin C, dexamethasone sodium phosphate, seaweed essence, brassinolide, boric acid, manganese sulfate, zinc sulfate, a plant growth hormone, a trace amount of preservative and distilled water to the coconut fumet, the coconut meat extract and the *astragalus* and *ephedra* root extract, and carry out ultraviolet disinfection and package to prepare the multi-effect tree dripping liquid.

Usage of the multi-effect tree dripping liquid includes: after a big tree is planted, drill a hole having a diameter of φ5 mm into the xylem on the trunk 2 to 5 cm from soil, insert an infusion apparatus and infuse the multi-effect tree dripping liquid.

The present disclosure has the following beneficial effect: the method for preparing the big tree dripping liquid is synthesized by coconut and a natural plant extract with an energy mixture, an anti-infective drug, a plant growth hormone, and trace elements, wherein it can achieve multiple purposes of supplying nutrients, balancing the water content inside the bodies of seedlings, preventing water transpiration, fast healing trauma root wounds, promoting early rooting, and preventing infection by one-shot application, is convenient to operate, and greatly improves the survival rate of seedling transplantation while improving the working efficiency;

according to principles of traditional Chinese medicine, the present disclosure uses *astragalus* and *ephedra* root having a special effect of consolidating superficial resistance to reduce the sensitivity of plant stomata guard cells to sunshine, temperature, water and carbon dioxide concentration so that the guard cells are dehydrated for a long time, thereby keeping the stomata slightly open to prevent water transpiration in the bodies of seedlings, ensuring water balance in tree bodies and solving the disadvantages of the membrane antitranspirant and the regulatory antitranspirant. Besides the regulatory effect on seedling stomata to reduce water transpiration, *astragalus* also has special effect on preventing and treating infection of wounded parts and promoting fast healing of wounded roots;

as seedling energy mixtures, adenosine triphosphate, glucose and vitamin B1 etc. supplement energy for tree bodies and effectively balance energy metabolism in the bodies of seedlings;

coenzyme A is able to activate metabolic substances in the bodies of seedlings, promote oxidization of substances in the bodies of seedlings and supply a certain amount of energy to solve the problem of oxygen deficiency after seedling transplantation;

enzymes are essential catalysts for energy metabolism in the bodies of seedlings; since there are many essential plant enzymes in coconut meat, such as isozymes and dismutases etc., the present disclosure is characterized in using natural enzymes in coconut meat as catalysts which is tens of thousands of times more effective than common catalysts;

nutrients and trace elements are supplemented by borax, seaweed essence, brassinolide, a manganese fertilizer and a zinc fertilizer;

as an antioxidant, vitamin C can effectively prevent bark from peeling off;

dexamethasone sodium phosphate prevents and controls infection, and promotes healing of wounds of wounded roots;

the plant growth hormone can promote early rooting of calli.

DETAILED DESCRIPTION

The present disclosure includes: 20% to 30% of coconut fumet, 5% to 13% of coconut meat extract, 28% to 38% of *astragalus* and *ephedra* root extract, 10% to 15% of 50% glucose injection, 2% to 7% of 99.8% seaweed essence, 5% to 11% of 0.0016% brassinolide, 2% to 7% of potassium sorbate; 600 to 1200 international units of coenzyme A, 40 to 60 mg of adenosine triphosphate, 300 to 500 mg of vitamin B1, 1 to 2 g of vitamin C, and 10 to 15 mg of dexamethasone sodium phosphate are added to each liter of the multi-effect tree dripping liquid, and a trace amount of boric acid, manganese sulfate, zinc sulfate, a plant growth hormone, and a preservative are added, and distilled water made up to 100%.

A method for preparing the multi-effect tree dripping liquid includes the following steps:

Step 1: use methods including decocting and distilling, or pressing, grinding, and soaking and filtering and the like to prepare *astragalus* and *ephedra* root into an *astragalus* and *ephedra* root extract and seal the *astragalus* and *ephedra* root extract for further use;

Step 2: take out coconut fumet and guide the coconut fumet into a container to be sealed and stored for further use;

Step 3: press, grind, soak and filter coconut meat, and obtain coconut meat extract which be sealed for further use;

Step 4: according to the volume percentage of each raw material, add a glucose injection, coenzyme A, adenosine triphosphate dissolved with a 50% glucose injection, vitamin B1, vitamin C, dexamethasone sodium phosphate, seaweed essence, brassinolide, boric acid, manganese sulfate, zinc sulfate, a plant growth hormone, a trace amount of preservative and distilled water to the coconut fumet, the coconut meat extract and the *astragalus* and *ephedra* root extract, and carry out ultraviolet disinfection and package to prepare the multi-effect tree dripping liquid.

Usage of the multi-effect tree dripping liquid includes: after a big tree is planted, drill a hole having a diameter of φ5 mm into the xylem on the trunk 2 to 5 cm from soil, insert an infusion apparatus and infuse the multi-effect tree dripping liquid.

The above are only preferred embodiments of the present disclosure. Any equivalent variation or modification according to the structures, characteristics and principles in the range of the patent application of the present disclosure is included within the scope of the patent application of the present disclosure.

What is claimed is:

1. A multi-effect tree dripping liquid, wherein raw materials of the multi-effect tree dripping liquid comprise: coconut fumet, coconut meal extract, astragalus, ephedra root, glucose injection, coenzyme A, adenosine triphosphate, vitamin B1, vitamin C, dexamethasone sodium phosphate, 98% seaweed essence, 0.0016% brassinolide, boric acid, manganese sulfate, zinc sulfate, a plant growth hormone, potassium sorbate and a preservative; wherein the percentages of the raw materials are as follows: 20% to 30% of coconut fumet by volume, 5% to 13% of coconut meat extract by volume, 28% to 38% of an astragalus and ephedra root extract by volume, 10% to 15% of 50% glucose injection by volume, 2% to 7% of 99.8% seaweed essence by volume, 5% to 11% of 0.0016% brassinolide by volume, 2% to 7% of potassium sorbate by volume; 600 to 1200 international units of coenzyme A, 40 to 60mg of adenosine triphosphate, 300 to 500mg of vitamin B1, 1 to 2g of vitamin C, and 10 to 15mg of dexamethasone sodium phosphate are added per liter of the multi-effect tree dripping liquid, and a trace amount of boric acid, manganese sulfate, zinc sulfate, the plant growth hormone, and the preservative are added, and distilled water made up to 100% by volume.

* * * * *